US011879583B2

(12) United States Patent
Kriens (10) Patent No.: US 11,879,583 B2
(45) Date of Patent: Jan. 23, 2024

(54) SNAP FITTING FOR PLUMBING

(71) Applicant: David J. Kriens, Des Moines, IA (US)

(72) Inventor: David J. Kriens, Des Moines, IA (US)

( * ) Notice: Subject to any disclaimer, the term of this patent is extended or adjusted under 35 U.S.C. 154(b) by 0 days.

(21) Appl. No.: 17/704,253

(22) Filed: Mar. 25, 2022

(65) Prior Publication Data

US 2022/0213997 A1     Jul. 7, 2022

Related U.S. Application Data

(60) Division of application No. 17/217,128, filed on Mar. 30, 2021, now Pat. No. 11,313,506, which is a division of application No. 15/495,610, filed on Apr. 24, 2017, now abandoned, which is a continuation of application No. 14/656,864, filed on Mar. 13, 2015, now Pat. No. 9,638,368, which is a division of application No. 13/269,760, filed on Oct. 10, 2011, now abandoned.

(60) Provisional application No. 61/530,446, filed on Sep. 2, 2011.

(51) Int. Cl.

| F16L 47/30 | (2006.01) |
|---|---|
| F16L 41/00 | (2006.01) |
| F16L 41/12 | (2006.01) |
| F16L 47/26 | (2006.01) |
| F16L 55/17 | (2006.01) |
| F16L 55/168 | (2006.01) |
| F16L 55/18 | (2006.01) |
| B29C 65/48 | (2006.01) |
| B29C 65/00 | (2006.01) |
| B29K 27/06 | (2006.01) |
| B29L 23/00 | (2006.01) |

(52) U.S. Cl.
CPC .......... *F16L 47/30* (2013.01); *F16L 41/004* (2013.01); *F16L 41/12* (2013.01); *F16L 47/26* (2013.01); *F16L 55/168* (2013.01); *F16L 55/17* (2013.01); *F16L 55/18* (2013.01); *B29C 65/4895* (2013.01); *B29C 66/5221* (2013.01); *B29C 66/5224* (2013.01); *B29C 66/52241* (2013.01); *B29K 2027/06* (2013.01); *B29L 2023/22* (2013.01)

(58) Field of Classification Search
CPC ........ F16L 47/30; F16L 55/18; F16L 55/168; F16L 47/26; F16L 55/17; F16L 41/004; F16L 41/12; F16L 55/10; B29C 66/5224; B29C 66/5221; B29C 65/4895; B29C 66/52241; B29K 2027/06; B29L 2023/22; B29L 2023/004; B29L 2031/24; B29L 2031/26
USPC ......... 285/197, 21, 423, 915, 198, 199, 200, 285/119, 180; 138/125
See application file for complete search history.

(56) References Cited

U.S. PATENT DOCUMENTS

| 30,051 A | 9/1860 | Drake | |
|---|---|---|---|
| 1,883,439 A * | 10/1932 | Adams | F16L 41/082 285/286.1 |
| 1,908,821 A | 5/1933 | Cornell | |
| 2,736,335 A | 2/1956 | Webber | |
| 2,972,779 A | 2/1961 | Cowley | |

(Continued)

*Primary Examiner* — Lawrence Averick
(74) *Attorney, Agent, or Firm* — Goodhue, Coleman & Owens, P.C.

(57) ABSTRACT

A snap fitting for use in plumbing is provided. The snap fitting includes a main body formed of plastic and shaped to extend partially around a cylindrical pipe to snap over the pipe and an inset for extending from an interior side of the main body into a hole in the cylindrical pipe.

16 Claims, 8 Drawing Sheets

(56) References Cited

U.S. PATENT DOCUMENTS

| | | | |
|---|---|---|---|
| 3,649,055 A | | 3/1972 | Nilsen |
| 3,723,229 A | * | 3/1973 | Hutton .............. B29C 66/52241 |
| | | | 156/580 |
| 3,891,247 A | | 6/1975 | Smith |
| 4,027,903 A | * | 6/1977 | Hannover ............ F16L 55/179 |
| | | | 285/31 |
| 4,073,513 A | | 2/1978 | Blakeley |
| 4,137,117 A | * | 1/1979 | Jones ................. B29C 66/1122 |
| | | | 156/303.1 |
| 4,202,379 A | | 5/1980 | Vetter |
| 4,260,094 A | | 4/1981 | Stroo |
| 4,573,628 A | | 3/1986 | Dohlen et al. |
| 4,606,558 A | | 8/1986 | Davidson |
| 4,966,397 A | * | 10/1990 | McKinnon .............. F16L 47/30 |
| | | | 285/423 |
| 5,007,666 A | | 4/1991 | Kyfes |
| 5,020,572 A | | 6/1991 | Hunt |
| 5,056,704 A | | 10/1991 | Martin et al. |
| 5,123,451 A | | 6/1992 | Savard |
| 5,199,464 A | | 4/1993 | Savard |
| 5,388,288 A | | 2/1995 | Fell |
| 5,788,414 A | * | 8/1998 | Gordon .................... G02B 6/50 |
| | | | 405/154.1 |
| 5,915,419 A | | 6/1999 | Tweedie et al. |
| 5,951,062 A | | 9/1999 | Miller |
| 6,705,801 B1 | | 3/2004 | Kiest |
| 7,182,155 B2 | | 2/2007 | Lange |
| 7,261,324 B2 | | 8/2007 | Tisch |
| 2006/0038397 A1 | | 2/2006 | Barrera |
| 2006/0284413 A1 | | 12/2006 | Barrera |
| 2008/0048435 A1 | * | 2/2008 | Sabastian ................ F16L 55/17 |
| | | | 285/15 |
| 2013/0056104 A1 | | 3/2013 | Kriens |

* cited by examiner

SNAP FITTING FOR PLUMBING

PRIORITY STATEMENT

This application is a Divisional of U.S. Application Ser. No. 17/217,128 filed on Mar. 30, 2021 which is a Divisional of U.S. application Ser. No. 15/495,610 filed on Apr. 24, 2017 which is a Continuation of U.S. application Ser. No. 14/656,864 filed on Mar. 13, 2015 now patented as 9,638,368 which is a Divisional of U.S. Application Ser. No. 13/269,760 filed on Oct. 10, 2011 which claims priority to U.S. Provisional Application No. 61/530,446, filed on Sep. 2, 2011, and all entitled Snap Fitting For Plumbing, which applications are all hereby incorporated by reference in their entirety.

FIELD OF THE INVENTION

This present invention to plumping. More particularly, the present invention relates to snap fittings which may be used in various plumping application including in pipe repairs and in providing wye or T fittings.

BACKGROUND OF THE INVENTION

Often times in plumping, pipes must be cut as part of the process of repairing a leak or adding another line (such as a T or wye connection). Whenever a pipe is cut additional problems are introduced.

One example of such a problem is the access area. When a pipe is cut as a part of repair, there needs to be sufficient access to the area to perform the necessary repair. If the pipe is in the wall this may involve cutting out a large area of drywall. If the pipe is under the floor this may involve cutting out a large portion of flooring. If the pipe is underground this may involve needing to dig out a large area. After the repair is complete the drywall or flooring will also need to repaired or the ground covering (dirt, concrete, etc.) replaced. It would be desirable to limit the size of the access area.

Another problem which occurs when a pipe is cut and a portion with a leak is removed and replaced involves aligning the ends of the pipe with the replacement portion. For example when the pipe is underground the ground may settle differently on opposite sides of the removed portion making it more difficult to obtain proper alignment of the pipe once the repair is made. If the ground settles differently after the repair additional stresses may be placed on the repaired portion of the pipe which may result in new complications requiring further repairs. It would be desirable if a pipe could be repaired without cutting it.

Another related problem with pipe repairs is that any repairs or installation of a wye or T fitting should leave the interior surface of the pipes smooth so as to not disrupt flow within the pipe and to avoid the build-up of debris.

Because of these and/or other issues repairs such as fixing a pipe can take significant amounts of time to perform. What is needed is a way to avoid these problems.

SUMMARY OF THE INVENTION

Therefore, it is a primary object, feature, or advantage of the present invention to improve over the state of the art.

It is a further object, feature, or advantage of the present invention to provide a fitting for a pipe which allows repairs to be easily and quickly made.

It is a still further object, feature, or advantage of the present invention to provide a fitting for a pipe which allows wyes, t's, or other types of connections to be made.

It is a further object, feature, or advantage of the present invention to provide for pipe repairs and/or the installation of a wye or T fitting that leaves the interior surface of pipes smooth so as not to disrupt flow within the pipe and to avoid build-up of debris within the pipe.

One or more of these and/or other objects, features, or advantages of the present invention will become apparent from the specification and claims that follow.

According to one aspect of the present invention, a snap fitting for use in plumbing is provided. The snap fitting includes a main body formed of plastic and shaped to extend partially around a cylindrical pipe to snap over the pipe and an inset for extending from an interior side of the main body into a hole in the cylindrical pipe.

According to another aspect of the present invention, a snap fitting for use in plumbing, is provided. The snap fitting includes a main body formed of plastic and shaped to extend partially around a cylindrical pipe to snap over the pipe and a connector integral with the main body for an additional line extending from the main body. The snap fitting is sized and shaped to fit over a hole in the cylindrical pipe while maintaining smooth interior walls of the cylindrical pipe. The connector can provide a T-connection or other type of connection.

According to another aspect of the present invention a method includes providing a snap fitting having a main body formed of plastic and shaped to extend partially around a cylindrical pipe to snap over the pipe, the snap fitting having an inset for extending around an interior side of the main body. The method further includes drilling a hole in the pipe at a place in need of repair and snapping the snap fitting into place over the hole in the pipe such that the inset is inserted into the hole.

According to yet another aspect of the present invention, a method includes providing a snap fitting having a main body formed of plastic and shaped to extend partially around a cylindrical pipe to snap over the pipe and a connector for an additional line extending from the main body. The method further includes creating a hole in the pipe at a place in which the additional line is needed and snapping the snap fitting into place over the hole in the pipe, such that an interior surface of the pipe remains smooth and fluid flow within the pipe is not disrupted.

DETAILED DESCRIPTION OF THE PREFERRED EMBODIMENTS

Figure 1:
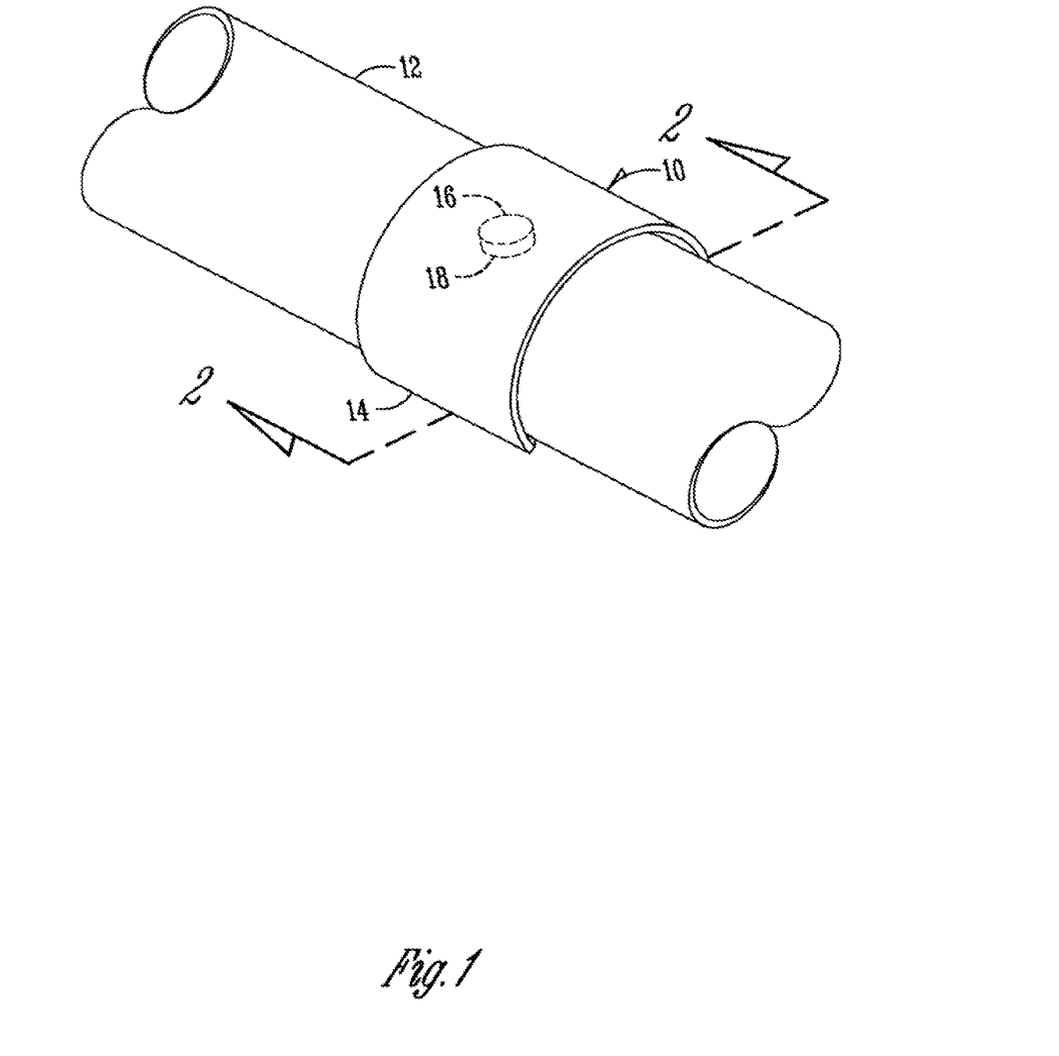
FIG. 1 is a perspective view showing a snap fitting in use to repair a pipe.

FIG. 1 illustrates a snap fitting 10 positioned on a pipe 12. The snap fitting 10 has a main body 14 which extends generally annularly around a position of the pipe 12. The main body 14 preferably extends over 50 percent around the pipe 12 which allows the snap fitting 10 to snap fit in place. Although not shown, solvents and glues may coated on the interior of the main body 14 and the exterior of the pipe 12 to attach the fitting 10 to the pipe 12.

There is an inset 16 which may be an integral portion of the snap fitting 10 or may be a separate piece which is attached to the snap fitting 10 (such as through a solvent cement or otherwise). The inset 16 fits within a hole 18 in the pipe 12 to plug the hole 18.

The snap fitting 10 may be made out of any number of plastic materials. One such type of material which is used in plumbing is polyvinylchloride, although other types of plastic materials may be used. The snap fitting may have a wall thickness substantially the same as the pipe on which it is being used.

Figure 2:
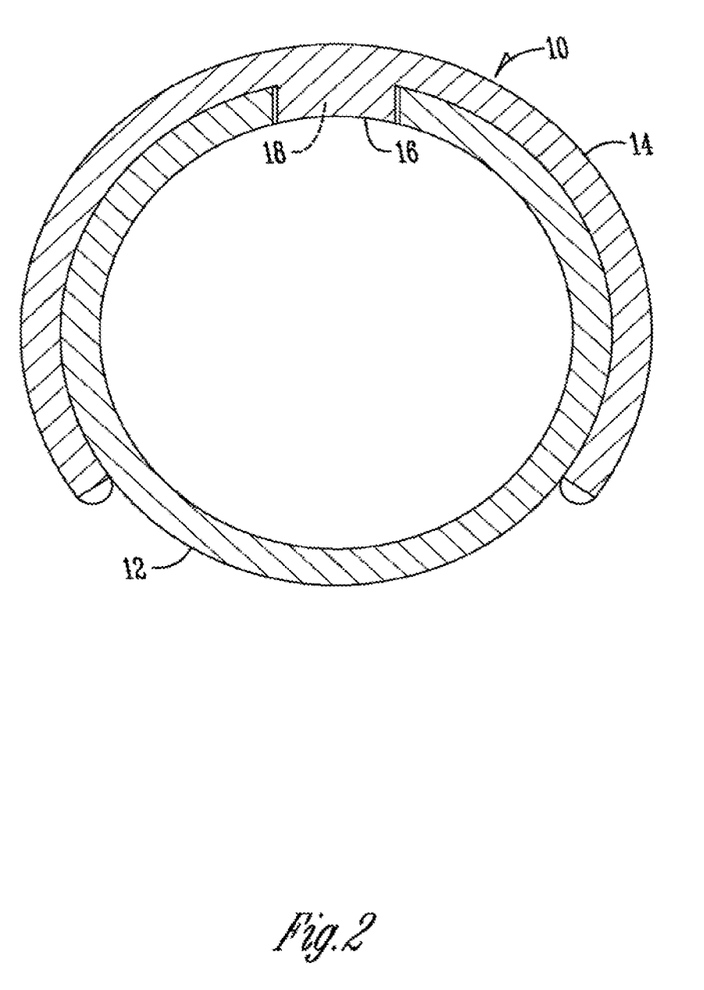
FIG. 2 is a cross-sectional view of the snap fitting shown in FIG. 1.

FIG. 2 illustrates a cross-section of the snap fitting 10 positioned on the pipe 12. Note that the inset 16 or wafer portion of the snap fitting 10 is positioned within the hole 18. Note also that the main body 14 of the snap fitting 10 extends more than about 50 percent around the pipe 12 to provide a tight fit.

In a typical scenario in which the snap fitting 10 is used, first the location of the leak in the pipe is identified. Next, a drill may be used to form a uniform hole 18 in the pipe 12 at the location of the hole, 18 preferably the edges of the hole 18 are beveled. Then the snap fitting 10 may be chemically welded in place with a solvent or otherwise affixed in place such that the inset 16 fits within the hole 18 on the pipe 12. Thus, the pipe 12 has now been repaired without cutting. Because the pipe is repaired without cutting, problems associated with cutting are avoided and the amount of time to repair the pipe 12 is greatly reduced in comparison to conventional methods.

Figure 3:
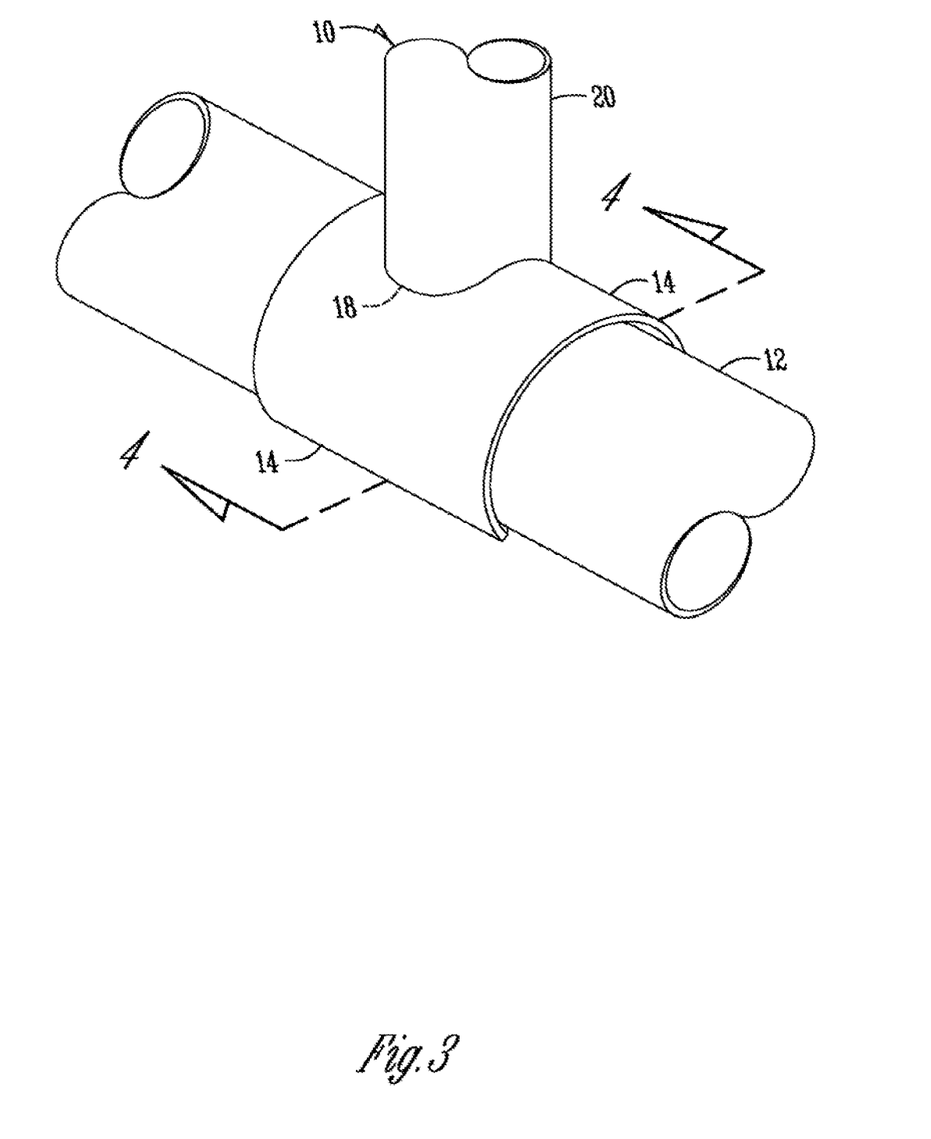
FIG. 3 is a perspective view of the snap fitting being used to provide a T-fitting.
Figure 4:
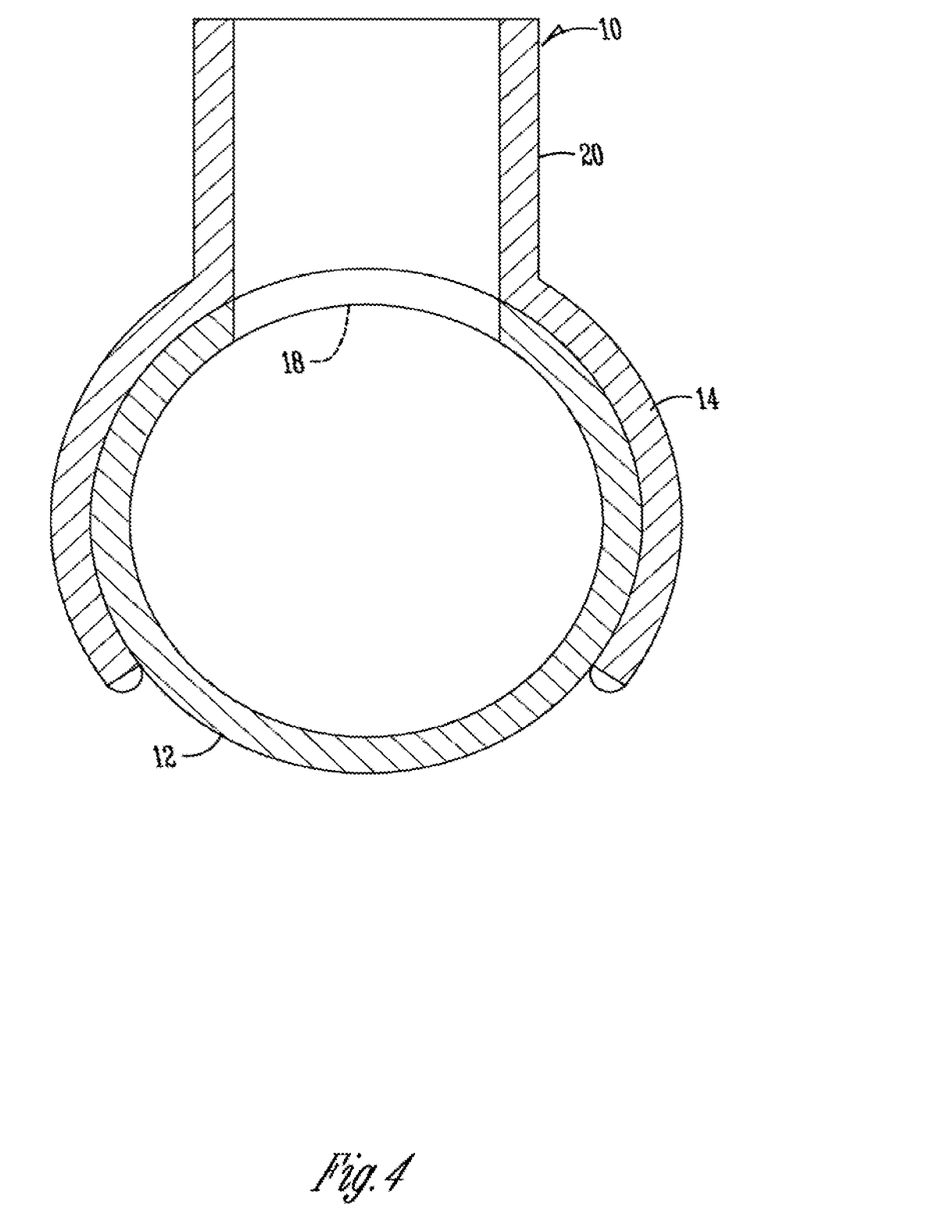
FIG. 4 is a cross-sectional view of the snap fitting shown in FIG. 3.

The snap fitting 10 of the present invention may be used for purposes other than repairing. For example, the snap fitting 10 may be used to provide a T or wye. FIG. 3 illustrates one example where the snap fitting 10 provides a T-connection. As shown in FIG. 3, a second line 20 (which may be in a T-configuration as shown, a wye configuration, or other configuration), extends from the main body 14 of the snap fitting 10. FIG. 4 provides a cross-sectional view.

Thus, in situations where an additional line is needed it is not necessary to cut the pipe. Instead, a hole 18 may be drilled out from the existing pipe and the snap fitting 10 may be snap fit in place. A glue or other bonding agent may be used to affix the pipe fitting in place.

Figure 5:
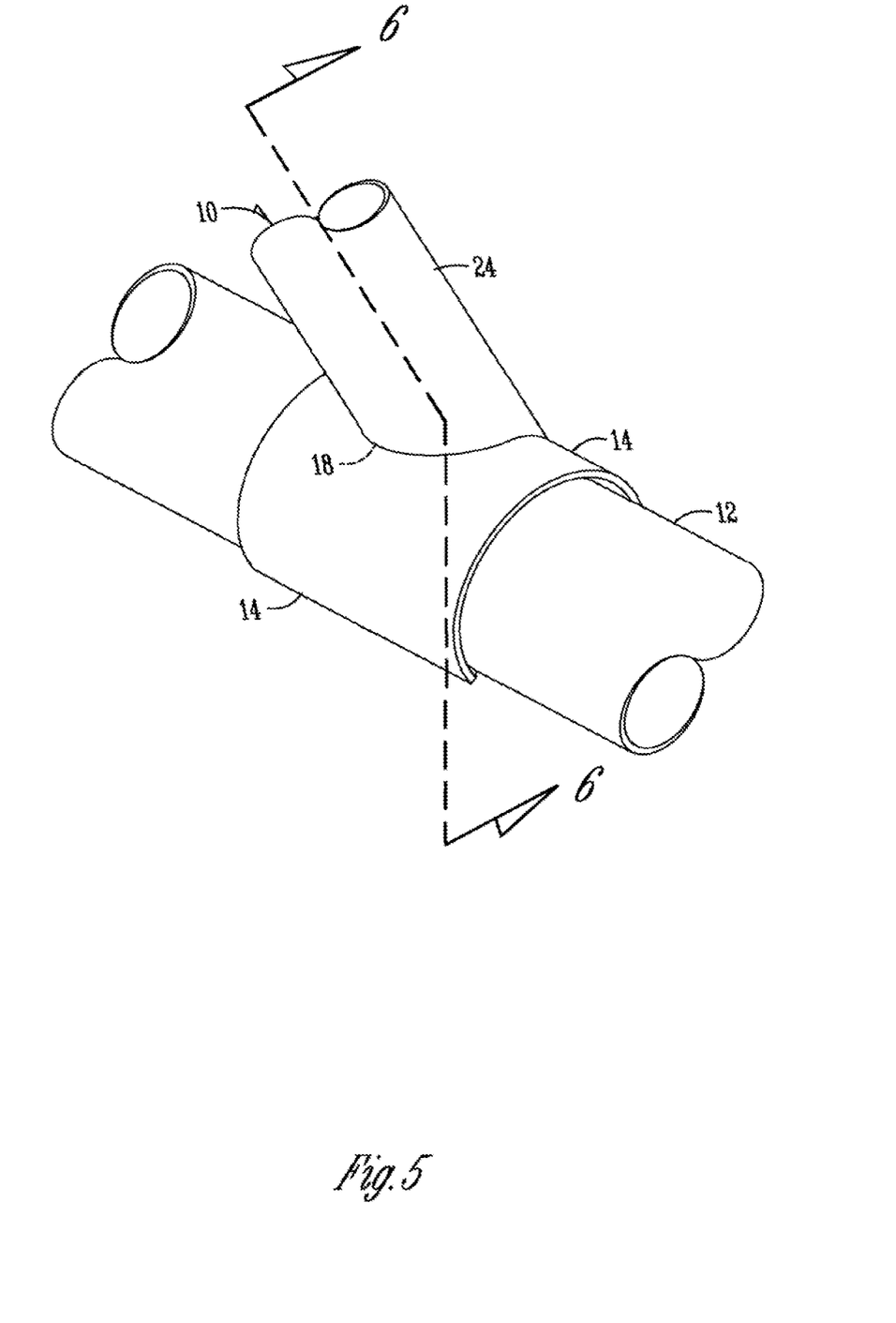
FIG. 5 is a perspective view of the snap fitting being used to provide a wye connection.
Figure 6:
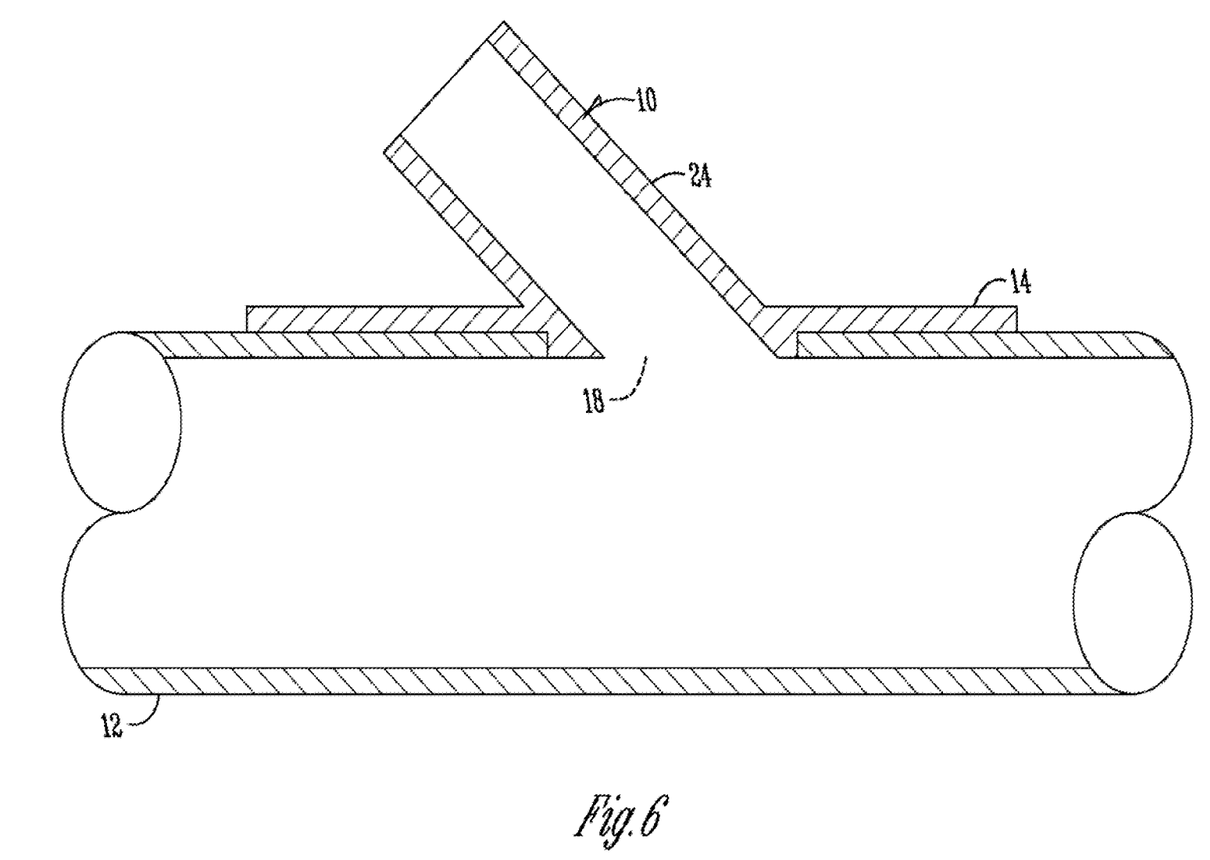
FIG. 6 is a cross-sectional view of the snap fitting shown in FIG. 5.

FIG. 5 and FIG. 6 illustrate the snap fitting 10 being used to provide a wye. As shown in FIG. 5, a second line 24 extends from the main body 14. Note that as shown in FIG. 6, after the installation, the pipe 12 has a smooth interior surface. The smooth and continuous interior surface is advantageous because it does not disrupt fluid flow through the pipe 12. In addition, there are no discontinuities where debris may build-up or accumulate. Where the snap fitting 10 is used to provide a second line, the hole 18 may be drilled or cut or melted. A specialized jig or melting tool may be used to remove a portion of the plate pipe.

Figure 7:
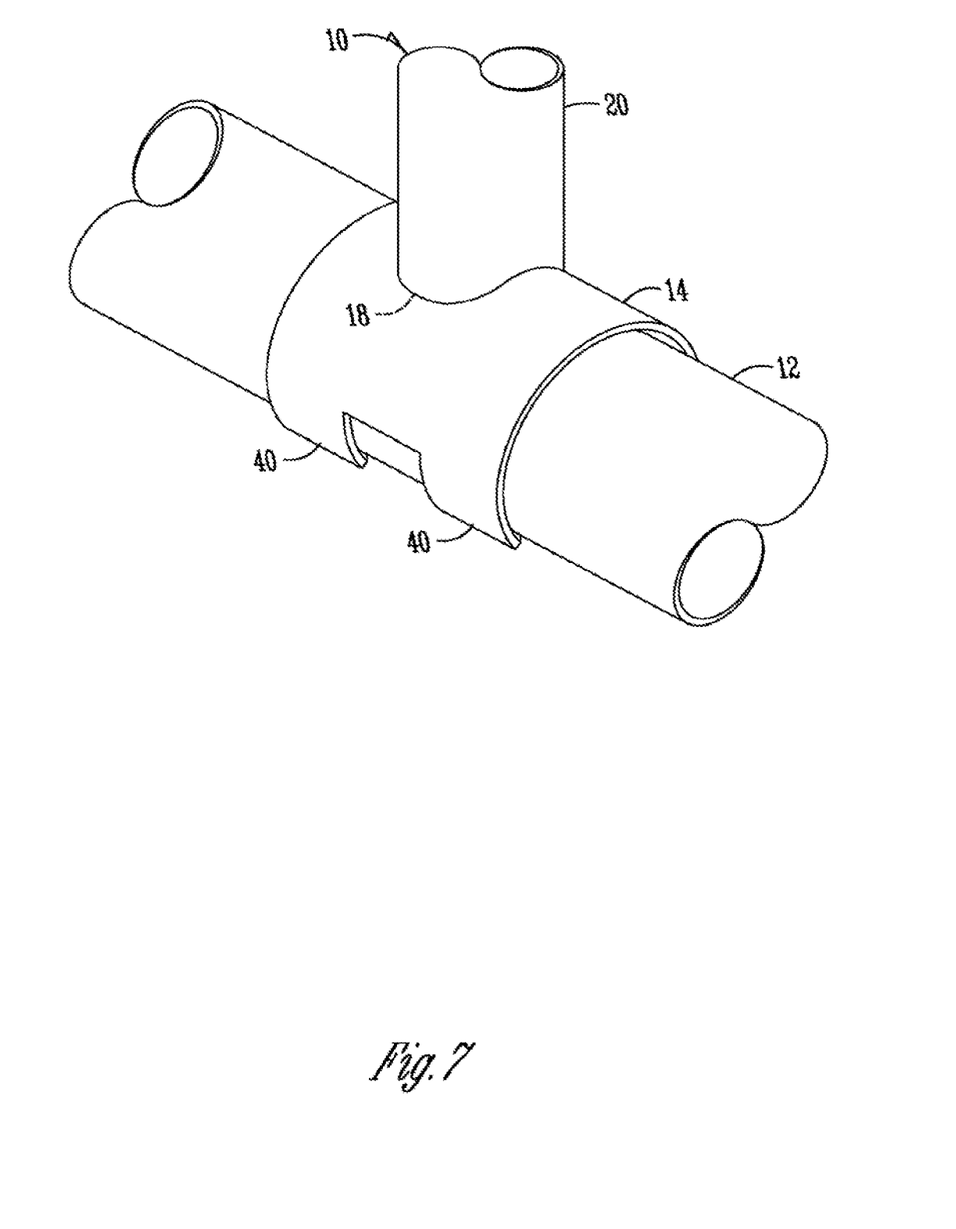
FIG. 7 is a perspective view showing another embodiment of the snap fitting installed on a pipe.
Figure 8:
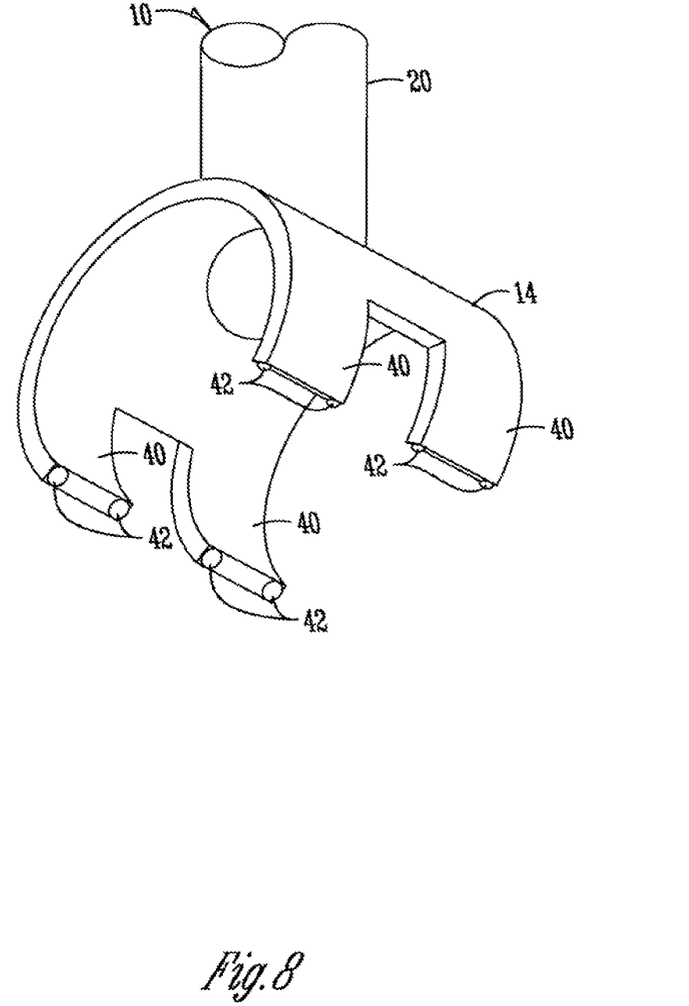
FIG. 8 is a perspective view of the snap fitting shown in FIG. 7.

FIG. 7 and FIG. 8 illustrate another embodiment of the present invention. The embodiment shown here reduces the surface area of the main body 14 and thus potentially the amount of glue or other bonding agent which is used to affix the main body 14 to the pipe 12. As shown in FIG. 7, the main body includes spaced part members 40 that extend partially around the pipe 12. Also, as best shown in FIG. 8, nubs 42 are present on the edges of each member 40. The nubs 42 assist in preventing glue or other bonding agent from being removed from the surface of a pipe 12 while the main body 14 is snapped into place. As shown there are two nubs, one on each corner of each of the members 42. It is contemplated, however, that more or fewer nubs may be used and the position of the nubs may be varied.

Although various embodiments of the invention have been shown it is to be appreciated that the present invention contemplates numerous variations, options and alternatives. These include the type of material, sizes, configurations, whether the snap fitting has an integral inset or a removable inset, how far the main body of the snap fitting extends around a pipe, and other variations, options, and alternatives. It is further to be understood that features from different embodiments may be combined. For example, all embodiments may include the nubs. The present invention is not to be limited to the specific embodiments shown here.

What is claimed is:

1. A snap fitting for use in plumbing to provide for installation of the additional line extending from the cylindrical pipe without cutting completely through the cross section of the cylindrical pipe, the snap fitting comprising:
   a main body formed of plastic and shaped to extend partially around an exterior wall of the cylindrical pipe to snap over the cylindrical pipe;
   a connector integral with the main body of the snap fitting for the additional line extending from the cylindrical pipe and extending from an interior side of the cylindrical pipe to allow the snap fitting to be snapped in place over a hole in the cylindrical pipe with the connector aligned with the hole in the cylindrical pipe and such that the edges of the hole are covered by the connector and an interior wall of the connector extends continuously downward from a top end of the connector into the hole past the exterior wall of the cylindrical pipe and the inner wall of the connector terminates in flush alignment with the interior side of the cylindrical pipe.

2. The snap fitting of claim 1 wherein the connector is a wye connector.

3. The snap fitting of claim 1 wherein the main body is sized and shaped to extend over at least 50 percent of the cylindrical pipe.

4. The snap fitting of claim 1 further comprising solvent on the main body for attaching the snap fitting to the cylindrical pipe.

5. The snap fitting of claim 1 further comprising glue on the main body for attaching the snap fitting to the cylindrical pipe.

6. The snap fitting of claim 1 further comprising a bonding agent on the main body for attaching the snap fitting to the cylindrical pipe.

7. The snap fitting of claim 1 wherein the plastic comprises polyvinylchloride.

8. The snap fitting of claim 1 wherein the interior wall of the main body and a wall of the cylindrical pipe have a same thickness.

9. A system comprising:
   a cylindrical pipe;
   a snap fitting for use in plumbing to provide for installation of the additional line extending from the cylindrical pipe without cutting completely through the cross section of the cylindrical pipe, the snap fitting comprising:

a main body formed of plastic and shaped to extend partially around an exterior wall of the cylindrical pipe to snap over the cylindrical pipe;

a connector integral with the main body of the snap fitting for the additional line extending from the cylindrical pipe and extending from an interior side of the cylindrical pipe to allow the snap fitting to be snapped in place over a hole in the cylindrical pipe with the connector aligned with the hole in the cylindrical pipe and such that the edges of the hole are covered by the connector and an interior wall of the connector extends continuously downward from a top end of the connector into the hole past the exterior wall of the cylindrical pipe and the inner wall of the connector terminates in flush alignment with the interior side of the cylindrical pipe.

10. The system of claim 9 wherein the connector is a wye connector.

11. The system of claim 9 wherein the main body of the snap fitting is sized and shaped to extend over at least 50 percent of the cylindrical pipe.

12. The system of claim 9 further comprising solvent on the main body for attaching the snap fitting to the cylindrical pipe.

13. The system of claim 9 further comprising glue on the main body for attaching the snap fitting to the cylindrical pipe.

14. The system of claim 9 further comprising a bonding agent on the main body for attaching the snap fitting to the cylindrical pipe.

15. The system of claim 9 wherein the plastic comprises polyvinylchloride.

16. The system claim 9 wherein the interior wall of the main body and a wall of the cylindrical pipe have a same thickness.

* * * * *